Aug. 18, 1964  W. T. SPROULL  3,144,881
CONSTRUCTION ELEMENT

Filed Aug. 18, 1961  3 Sheets-Sheet 1

INVENTOR:
WAYNE T. SPROULL
BY *E. Wallace Breset*
ATTORNEY

Aug. 18, 1964   W. T. SPROULL   3,144,881
CONSTRUCTION ELEMENT
Filed Aug. 18, 1961   3 Sheets-Sheet 2
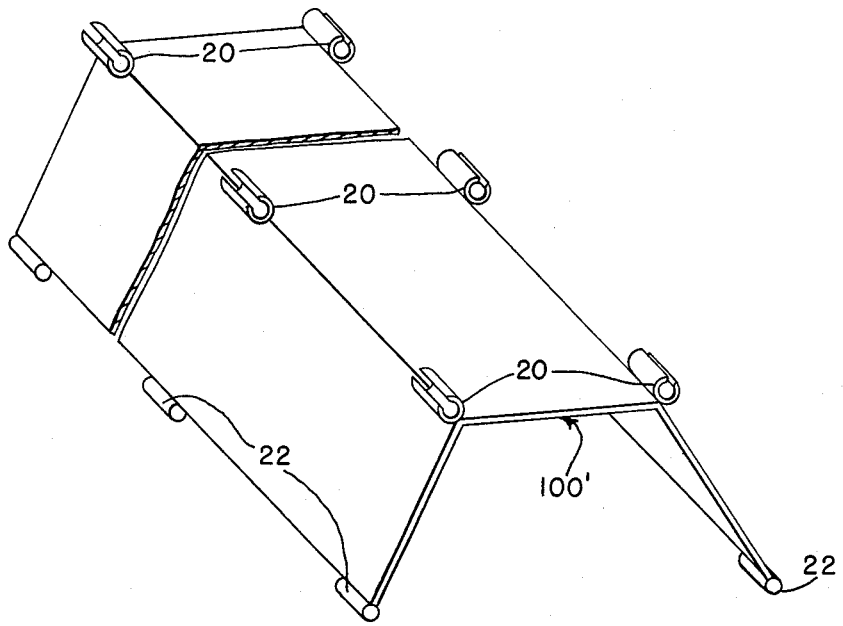
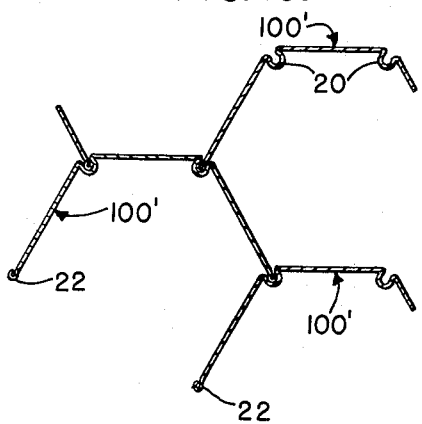
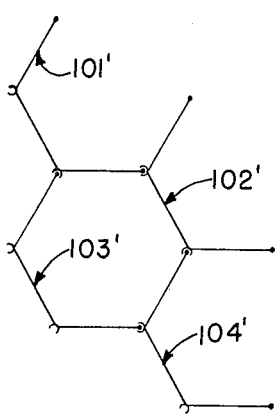
INVENTOR:
WAYNE T. SPROULL
BY *E. Wallace Bewett*
ATTORNEY

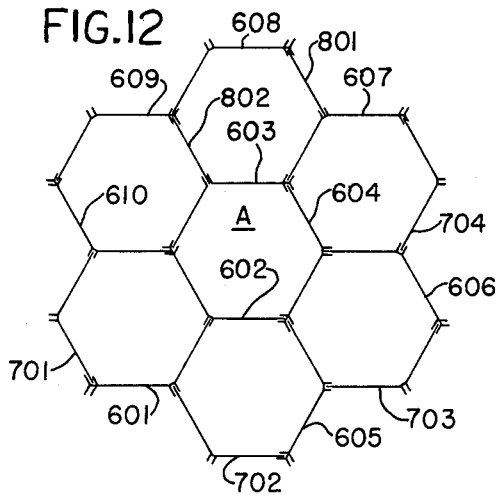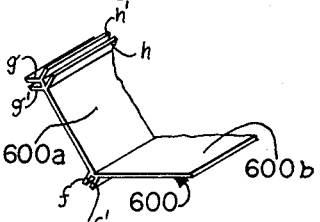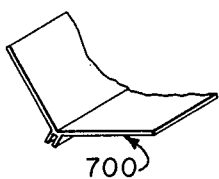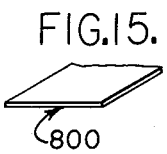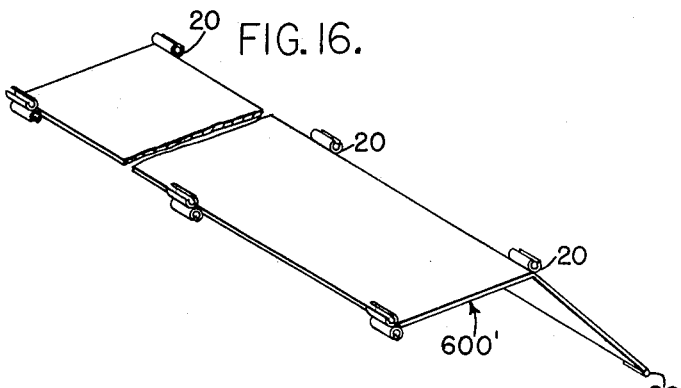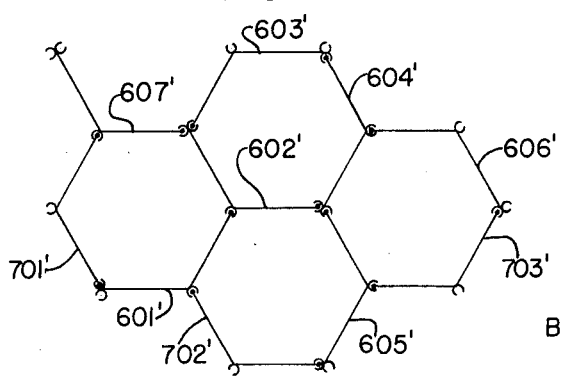

United States Patent Office 3,144,881
Patented Aug. 18, 1964

3,144,881
CONSTRUCTION ELEMENT
Wayne T. Sproull, Glendale, Calif., assignor to Joy Manufacturing Company, Pittsburgh, Pa., a corporation of Pennsylvania
Filed Aug. 18, 1961, Ser. No. 132,378
8 Claims. (Cl. 138—117)

This invention relates to a basic construction element from which a duct bank assembly can be made easily and economically. The invention is characterized by a novel design for the basic construction element comprising three adjoining sides of a hexagonal duct, and by an arrangement of the basic construction elements which provides a plurality of parallel hexagonal ducts with no waste space between adjacent ducts. The inner or concave surface of each basic construction element forms three adjoining sides of one hexagonal duct, and the outer, or convex surface of each construction forms one side in each of three adjacent hexagonal ducts.

This application is a continuation-in-part of application Serial No. 857,620, filed December 7, 1959, since abandoned.

Banks of parallel ducts are used in many applications; for example, as underground conduits for telephone or power lines, heat exchangers, in centrifugal or electrostatic dust collectors, etc., which commonly contain 100 or more ducts arranged in parallel relation in a single bank. A centrifugal dust collector may contain more than one such bank, giving a total of several hundred parallel ducts in one installation. In these installations it is particularly desirable that the parallel ducts be fabricated with a minimum of waste space. In addition, the cost and ease of shipment and assembly of the individual elements to erect the duct bank become very important.

Various constructions have been proposed to provide hexagonal ducts for centrifugal and electrostatic collectors but have not been satisfactory for various reasons. One reason is poor economy of materials since some known arrangements have resulted in double thickness in some walls between ducts. Another reason is poor economy of labor in erection of the final assembly so that all other savings are nullified by the excessive labor required in building the duct assembly in the field.

In accordance with this invention a novel construction element has been devised which can be quickly assembled to form a bank of nested parallel ducts with no waste space between adjacent ducts. The construction elements, which are shaped in the form of three adjoining sides of a regular hexagonal duct, can be shipped in a minimum of space, since they can be nested together like a pile of eave troughs. When the construction elements are received at an installation site, they can be quickly assembled to form a duct bank having any desired number of parallel ducts. Due to the novel structure and arrangement of the basic construction element, the assembled duct bank can be held together as a solid unit by one of various means, as for example a rope or wire wrapped around the periphery of the bank, thereby obviating the use of bolts, adhesives, clips, or other fasteners at the joints between the individual construction elements within the bank. If desired, incomplete ducts on the periphery of the duct bank made only from the basic units can be completed with auxiliary construction elements provided as a refinement of the invention.

Accordingly, a general object of this invention is to provide a bank of parallel ducts with no waste space between adjacent ducts therein.

Another object of this invention is to provide a single construction element of which a plurality can be assembled to form a bank of parallel ducts; the construction element being simple and sturdy in structure, low in cost, of minimum volume for storage or shipping, and easy to assemble.

An additional object of this invention is to provide a basic construction element which can be assembled to form a rigid bank of parallel ducts without requiring any bolts, clips, adhesives, or special fasteners between the individual construction elements of a bank.

A further object of this invention is to provide auxiliary construction elements for completing any ducts left open on the periphery of a duct bank formed only from the above mentioned basic construction element.

Other objects and advantages of this invention will be apparent to those skilled in the art from the following description of one illustrative embodiment thereof, in connection with the annexed drawing, in which:

FIG. 9 is a perspective view of a modification of the basic construction element of this invention as shown in FIG. 2.

FIG. 10 illustrates a partial duct assembly formed by using the basic construction element of FIG. 9.

FIG. 11 is a diagrammatic end elevational view of a portion of a duct bank assembled from the basic construction element of this invention as illustrated in FIG. 9.

FIG. 12 is a diagrammatic end elevational view of a duct bank assembled from the basic construction element of a second embodiment of this invention, with certain ducts on the periphery thereof completed by auxiliary construction elements of this invention.

FIG. 13 is a fragmentary perspective view of the basic construction element of FIG. 12.

FIG. 14 is a fragmentary perspective view of a first optional auxiliary construction element of FIG. 12.

FIG. 15 is a fragmentary perspective view of a second optional auxiliary construction element of FIG. 12.

FIG. 16 is a perspective view of a modification of the basic construction element of FIG. 12.

FIG. 17 is a diagrammatic end elevational view of a portion of a duct bank assembled from the basic construction elements of FIG. 16 with certain ducts on the periphery thereof completed by auxiliary construction elements analogous to those of FIGS. 14 and 15.

Figure 1:
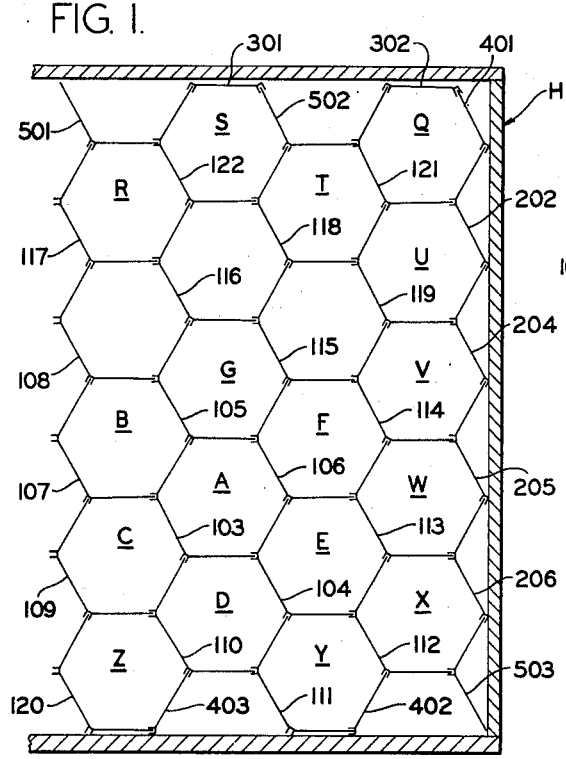
FIG. 1 is a diagrammatic end elevational view of a duct bank assembled from the basic construction element of a preferred embodiment of this invention, with certain ducts on the periphery thereof completed by auxiliary construction elements of this invention.
Figure 7:
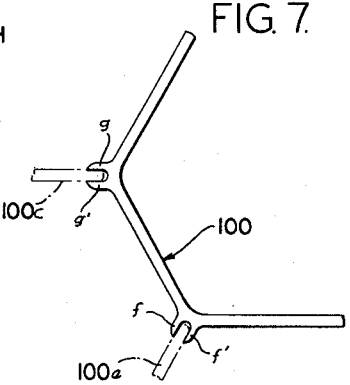
FIG. 7 is an enlarged end elevation of the construction element of this invention as shown in FIG. 2, formed by integral casting or molding or extruding.
Figure 2:
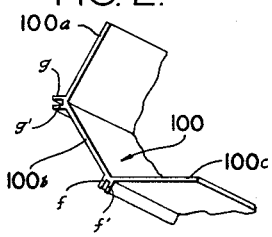
FIG. 2 is a fragmentary perspective view of the basic construction element of FIG. 1.
Figure 5:
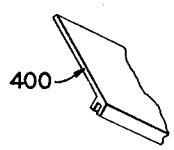
FIG. 5 is a fragmentary perspective view of a third optional auxiliary construction element of FIG. 1.
Figure 6:
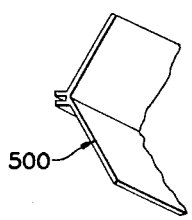
FIG. 6 is a fragmentary perspective view of a fourth optional auxiliary construction element of FIG. 1.

The basic construction element of this invention is shown at 100 in typical form in FIG. 2, and in greater detail in FIG. 7. Referring to FIG. 2, the construction element comprises three flat, angularly disposed, integral sections 100a, 100b, 100c which are of a construction to form three adjoining sides of a hexagonal duct. The basic construction element has an inner, or concave, surface and an outer, or convex surface. On the concave inner surface, the three sections forming the construction element meet to define two interior angles of 120°; the central section 100b and one side section 100a forming one 120° angle, and the central section 100b and the other side section 100c forming the other 120° angle. On the convex surface the three sections define two exterior angles of 240°; one exterior angle corresponding in location to each interior angle, as they lie back to back. Along the vertex of each exterior angle are projecting fins f, f' and g, g' which are arranged in spaced pairs to define channels or sockets which receive the edges of abutting construction elements. The channels are directed to bisect the exterior angles, such that the construction elements can be arranged in mutual tongue and groove relation to form the honeycomb arrangement of regular hexagonal ducts shown in FIG. 1. Fins f, f' are spaced apart to receive the edge of an adjoining element with a sliding fit, as for example the edge of a section 100a as in FIG. 7. Fins g, g' form a second channel or socket receiving the edge of section 100c of another adjoining element.

The length of the basic element 100 perpendicular to the plane of FIG. 1, may be any desired dimension. For most uses now contemplated each basic element can be made as a continuous piece for the length desired. Beyond the length of a single element, the duct can be extended by abutting elements endwise to form aligned ducts.

Figure 8:
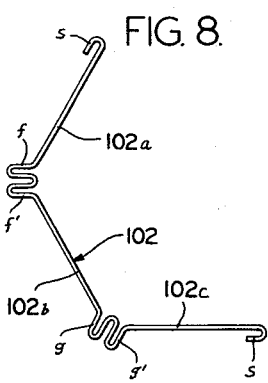
FIG. 8 is an enlarged end elevation of another design of the construction element of this invention as shown in FIG. 2 formed by stamping or bending sheet metal.

As shown in FIGS. 7 and 8, the basic construction element can be made as an extruded, cast, or molded unit from ceramic material, plastic, metal, or the like (FIG. 7); or it can be stamped out of sheet metal (FIG. 8). Element 100 is especially adapted to be formed economically by extrusion methods. The particular method and material used for fabricating the basic construction elements will, of course, depend on the specific requirements of the application, and therefore no specific material or method of fabrication is specified as preferable. Both of the structures illustrated in FIGS. 7 and 8 are practical for certain requirements, and the choice between these, and other methods of fabrication will be apparent to those skilled in the art for any given application of the invention.

The specific element in FIG. 8 is designed for manufacture from sheet metal. Between each two adjoining sides 102a, 102b and 102c are multiple folds of metal at f, f' and g, g'. The folds assume a generally W-shaped and stiffen the basic element. At their outer edges, sides 102a and 102c are reversedly outwardly folded, which folds S are of a size to slip into the socket defined by the two inner thickness of metal at one of the pairs of folds f, f' or g, g'. The return folds S may be made slightly oversize to insure a snug fit in the sockets or channels formed at f, f' and g, g', thus producing a tight fit and giving rigidity to the completed assembly.

The basic elements 100 are assembled as shown in FIG. 1 to form a plurality of hexagonal ducts with no waste space between adjacent ducts. In the central portion of the duct bank the common construction elements 100 are themselves sufficient to complete a number of ducts, but around the periphery of the completed bank certain ducts are left incomplete when only the basic construction element 100 is used. For this reason various auxiliary or optional construction elements have been devised for completing the peripheral ducts. The auxiliary construction elements, which are shown in FIGS. 3 through 6, will be discussed in detail in later paragraphs, but it should be noted at this point that each auxiliary element can be formed from the basic construction element 100 by breaking or cutting away sections thereof. Therefore it is possible to assemble a completed duct bank from the basic construction elements 100 alone, either by leaving some of the peripheral ducts incomplete, which does not cause any appreciable waste of space in large duct banks, or by cutting or breaking off unused sections of the basic construction elements on the periphery of the duct bank to complete the incompleted peripheral ducts.

Referring to FIG. 1, the central ducts in the duct bank are each formed from a combination of portions of four basic construction elements, with one construction element forming three adjoining sides of the duct, a second construction element forming a fourth side of the duct adjacent to the three adjoining sides, a third construction element forming a fifth side of the duct adjacent to the three adjoining sides, and a fourth construction element forming a sixth side of the duct extending between the fourth and fifth sides. For example, duct A is formed from the combination of common construction elements 103, 104, 105 and 106; with construction element 103 forming three contiguous sides of duct A, and a side section of construction element 104 forming a fourth side of duct A adjacent to the three adjoining sides, and a side section of construction element 105 forming a fifth side of duct A adjacent to the three adjoining sides, and the central section of construction element 106 forming a sixth side of duct A extending between the fourth and fifth sides thereof.

In the structure shown in FIG. 1, each basic construction element acts as a boundary wall for four adjacent ducts; the concave surface of each construction element forms three adjoining sides of a first duct, the outer surface of one side section of the construction element serving as one side of a second duct adjacent to the first duct, and the outer surface of the central section of the construction element serving as one side of a third duct adjacent to the first and second ducts, and the outer surface of the other side section of the construction element serving as one side of a fourth duct. For example, the concave surface of construction element 103 serves as three adjoining sides of duct A, the outer surface of one end section of construction element 103 serves as one side of duct B, the outer surface of the central section of construction element 103 serves as one side of duct C, and the outer surface of the other end section of construction element 103 serves as a side of duct D.

In the above described arrangement it will be noted that the central sections of all construction elements of the 100 series are parallel to each other, and that the concave surfaces of all construction elements are directed in the same direction. If this general arrangement is followed, any number of nested ducts can be assembled very quickly from the basic construction elements, as shown in FIG. 1.

When the basic construction elements alone are used to assemble a duct bank, certain peripheral ducts are left incomplete. In the example shown in FIG. 1 the incompleted peripheral ducts would be Q, R, S, T, U, V, W, X, Y and Z. These ducts can be left incomplete, if desired, or can be removed by breaking or cutting off the unused portions of the construction elements which project beyond the completed ducts to form the incomplete sections. It is preferable, however, to have a convenient means of completing the peripheral ducts without breaking the basic construction elements, and for this purpose optional auxiliary construction elements 200, 300, 400 and 500 are provided, as shown in FIGS. 3 through 6. It will be noted that each auxiliary construction element is simply a selected portion of the basic construction element.

Figure 3:
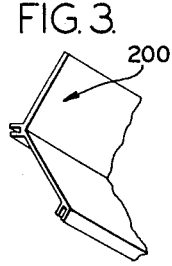
FIG. 3 is a fragmentary perspective view of a first optional auxiliary construction element of FIG. 1.

Referring to FIGS. 2 and 3, it will be seen that auxiliary element 200 is the same as the basic element 100 less one side 100c. Two pairs of fins defining sockets respectively remain so that the element may still receive or connect to the edges of two adjoining elements. By additionally removing the pair of fins f, f' from the element 100, another auxiliary element 500 is produced as in FIG. 6, that has two flat sections but can receive or connect to the edge of only a single adjoining construction element.

Figure 4:
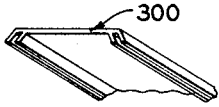
FIG. 4 is a fragmentary perspective of a second optional auxiliary construction element of FIG. 1.

The auxiliary element 300 illustrated in FIG. 4 is derived from the basic element by removing the two wing sections 100a and 100c. The auxiliary element 400 in FIG. 5 likewise has only a single flat section; and it differs from element 300 in that it has channel or socket forming fins at one margin only.

Referring to FIG. 1, peripheral sections Q, R, S, and T are completed by auxiliary construction elements 301, 302, 501, 502, 202 and 401 as shown. Peripheral ducts U, V, W and X are completed by auxiliary sections 202, 204, 205, 206 and 503. Peripheral ducts Y and Z are completed by elements 402 and 403. The arrangement of the auxiliary elements to complete the corresponding peripheral ducts will be apparent from FIG. 1.

The auxiliary construction elements can be fabricated individually by the same method used in fabrication of the common construction element. Or, if the construction elements are fabricated from a breakable material, such as ceramic, all four auxiliary elements can be provided by a common construction element scored for breakage at the base of projecting channel fins. In the latter method, the scored construction elements could be shipped in the same package with the basic construction elements, and broken at the installation site to form the optional sections shown in FIGS. 3 through 6. If the construction elements are made of metal, plastic, or some other suitable material, the optional elements can be made at the installation site by simply cutting the basic construction elements along the base of appropriate fins.

In assembling the duct bank, it is advantageous when possible to arrange the basic construction elements with the central sections horizontal and the concave surfaces directed upwardly. When the duct bank is assembled in this manner, the individual construction elements will be held together by gravity, without any adhesives or fasteners at the joints. When the desired number of ducts have been formed, the assembly can then be secured in a solid unit by various means. The simplest is wrapping a rope or wire around the outside of the bank.

In either a vertical or horizontal position the assembly can be held in position by building around it a box or frame of rigid members as indicated at H in FIG. 1. The frame can be shaped to fit the assembly or internal braces can be added. If the assembly is horizontal and located in the ground, dirt piled around it will hold the assembly in place.

If permanent or gas impervious joints are desired between the individual construction elements, any suitable adhesive or fasteners can be employed to obtain a gastight fit of the element with fins engaging it.

From the foregoing description it will be apparent that this invention provides a bank of parallel ducts with no waste space between adjacent ducts, and that this invention provides a basic construction element which can be used to assemble a bank of parallel ducts; the basic construction element being simple and sturdy in structure, low in cost, of minimum volume for storage or shipment, and easy to assemble. It will also be apparent that this invention provides a construction element a plurality of which can be assembled to form a rigid bank of parallel ducts without requiring any bolts, clips, adhesives, or other fasteners between the individual construction elements of the bank.

In FIG. 9 there is shown a basic construction element 100' which is an interlocking modification of the basic element 100 of FIGS. 1 and 2, which differs from the element 100 in that the fins f, f' and g, g' along the vertices of the exterior angles formed by the flat surfaces of the adjoining sides 100a, 100b, 100c of the basic element 100, have been omitted and replaced by a plurality of axially slotted tubular members generally indicated by the numeral 20. These tubular elements 20 are rigidly secured upon the vertices of the exterior angles in axially spaced relationship with each other and axially aligned with the vertex upon which they are secured having the slotted portion of their peripheries directed outwardly away from the vertex upon which they are secured, the width of these slots being substantially equal to the thickness of the side 100a. A number of cylindrical members 22 equal to the number of tubular members 20 are rigidly secured in axially aligned and axially spaced relationship to each other on the outermost edges of the construction element 100', parallel to the vertices of the exterior angles. The axial spacing of the cylindrical members 22 is equal to that of the tubular members 20 so that when a plurality of the structural elements 100' is assembled as shown in FIGURE 11 the tubular elements 20 become the female members or sockets and the cylindrical elements 22 become the male members of a series of interlocking mechanical joints with the members 22 being slidably received and rigidly secured within the members 20 to secure the assembly in the relationship illustrated in FIG. 11. Auxiliary construction elements of the interlocking type, analogous to those illustrated in FIGS. 3, 4, 5 and 6 may be constructed in the same manner, to be used to complete certain peripheral ducts of the assembly which would otherwise be left incomplete. These elements may be produced by using the appropriate part of element 100' in the same manner as the auxiliary elements of FIGS. 3, 4, 5 and 6 were described as being produced from the element 100.

The duct bank shown in FIG. 1 requires the use of some external means of holding the assembly together, the duct bank of FIG. 11 however is self supporting and needs no external means for maintaining the relationship of the various elements. The assembly of the duct bank of FIG. 11 is accomplished by the longitudinal displacement of one construction element as 101' in relation to an adjacent construction element 102' through a distance equal to the length of one of the cylindrical members 22 and then after axially aligning the cylindrical and the tubular members the aforementioned joint may be formed by sliding the cylindrical members within the tubular members until the two elements 101' and 102' are transversely aligned along their end surfaces. Repetition of this assembly procedure with a plurality of structural members as 103' and 104' will result in the formation of a duct bank having the property of retaining its individual parts in the desired relationship to each other without the necessity of external fastening means. It is to be realized that the tubular members or sockets 20 and the cylindrical members 22 could be extended for the full length of the exterior angle vertices and the outer edges of the structural elements 100' respectively. In this case the assembly of the duct bank would necessitate the longitudinal displacement of each structural element for its full length before engagement of the members 22 and 20. A duct bank assembled according to this description would be much stronger than those earlier described and more suitable for isolating the interior of one duct from that of an adjacent one if such isolation is desired.

Referring to FIG. 12 there is shown a duct bank assembled from a plurality of basic construction elements 600 together with a number of auxiliary construction elements 700 and 800 constructed according to the principles of this invention and constituting a second embodiment thereof. The basic construction element 600 illustrated in FIG. 13 consists of a pair of elongated flat sections 600a and 600b joined together along a longitudinal side to form an internal angle of 120° and an exterior angle of 240° back to back. The fins ff' as hereinbefore described (see FIG. 2) form a spaced pair of projecting elements parallel to, and equally laterally spaced from, the vertex of the exterior angle to slidably receive therebetween the edge of an adjacent construction element as shown in FIG. 12. In like manner four fins g,g' and h,h' form spaced pairs respectively along one longitudinal edge of the flat surface 600b, with fins g,g' forming an angle of 120° with the surface of the exterior angle and the fins h,h' forming an angle of 120° with the surface of the interior angle, to slidably receive the edges of two adjacent construction elements as shown in FIG. 12. FIG. 14 illustrates an auxiliary element 700 which can be formed by cutting off the fins g,g' and h,h' from a construction element 600. The FIG. 15 illustrates a second auxiliary construction element 800 which is simply a flat rectangular piece of the material used for the other construction elements and could be formed by cutting off the fins and one flat surface of the auxiliary construction element 700. FIG. 12 illustrates the use of these basic construction elements 600 and auxiliary construction elements 700 and 800 to assemble a duct bank similar to that of FIG. 1. It is to be noted however that the basic construction element 600 is suitable for forming only one of the desired hexagonal ducts A while each of the other hexagonal ducts requires one or more of the auxiliary elements in its construction. In some respects the manufacture of the basic construction element 600 is simpler than that of the basic construction element 100, however, if it is desired to restrict the number of auxiliary elements, such as 700 and 800, which are required in the construction of a duct bank, the element of the first embodiment would be more suitable.

FIG. 16 illustrates the construction of an interlocking type of basic construction element 600' similar to that which was used in the production of the basic construction element 100' of FIG. 9. The application of the interlocking type of basic construction element 600', together with that of another auxiliary construction element of the interlocking type 700' in the formation of a duct bank, is shown in FIG. 17. The duct bank of FIG. 17 has advantages analogous to those attributed to the duct bank of FIG. 11 and could be used in similar situations.

It is to be appreciated that various methods of manufacture such as were applied to the production of the basic construction element 100 in FIGS. 7 and 8 may be used in the production of the basic elements 100', 600, 600', however, for greater ease of understanding, the production of the basic construction element 100' from a single piece of sheet metal, with the tubular members 20 and the cylindrical members 22 being integrally formed from the same piece of material used to make the element 100' is illustrated in FIG. 10.

Geometrical analysis shows that the principles of this invention may be applied to duct banks composed of a multiplicity of triangular, square or rectangular ducts as will be apparent to those skilled in the art. It is to be appreciated however that a greater area of sheet metal will be required in the production of a given number of ducts of triangular, square or rectangular configuration than will be required for the same number of ducts of equal cross sectional area of the type illustrated in FIG. 1. The application of topological principles, dealing with the relationship between the number of surfaces and the number of edges associated with a basic construction element, shows that a duct bank composed of a series of square or rectangular ducts would have a basic construction element of two surfaces at right angles to each other, forming a 90° interior angle and a 270° exterior angle and having two pairs of fins extending from the vertex of the exterior angle. Application of the basic construction element would require auxiliary construction elements only along two adjacent sides of any given duct bank. A further application of topological principles shows that for a duct bank made up of a series of triangular ducts, a desirable basic element would comprise all three sides of a basic triangular duct with connections for abutting elements grouped about the vertex of one of the exterior angles thereof.

It should be understood that this invention is by no means limited to the specific structures and arrangements set forth above. Many modifications can be made in the specific structures shown without departing from the basic teaching of this invention, and this invention includes all modifications falling within the scope of the following claims.

What is claimed is:

1. A structure providing a bank of nested ducts comprising a plurality of geometrically congruent construction elements, each of said elements having at least two angularly disposed portions forming contiguous sides of a duct, each two portions having a common edge and at least one free edge, said two portions forming a dihedral angle having said common edge as the vertex of said dihedral angle, and means located along said vertex exterior to said dihedral angle engaging a free edge of at least one other of said construction elements forming said bank of nested ducts to locate adjacent elements in respect to each other.

2. A structure providing a bank of nested ducts comprising a plurality of geometrically congruent construction elements, each of said elements having at least two angularly disposed portions forming contiguous sides of a duct, each two portions having a common edge and at least one free edge, said two portions forming a dihedral angle having said common edge as the vertex of said dihedral angle, and means located along one of said free edges and along said vertex exterior to said dihedral angle engaging a free edge of at least one other of said construction elements forming said bank of nested ducts to locate adjacent elements with respect to each other.

3. A structure providing a bank of nested hexagonal ducts comprising a plurality of geometrically congruent construction elements, each of said construction elements comprising three elongated flat sections angularly disposed to each other with interior angles of 120° and exterior angles of 240° between successive flat sections, the concave inner surface of one of said construction elements forming three contiguous sides of a first regular hexagonal duct, the outer surface of one section of a second construction element forming a fourth side of the hexagonal duct adjacent to one of said three contiguous sides, the outer surface of one section of a third construction element forming a fifth side of the hexagonal duct adjacent to another of said three contiguous sides, the outer surface of one section of a fourth construction element forming a sixth side of the hexagonal duct extending between said fourth and fifth sides thereof, each of said second, third and fourth elements forming three sides of second, third and fourth hexagonal ducts adjacent to said first hexagonal duct, said second, third and fourth hexagonal ducts being completed by additional construction elements located as above described for said first hexagonal duct.

4. A structure providing a bank of nested hexagonal ducts comprising a plurality of geometrically congruent construction elements, each of said construction elements comprising three elongated flat sections angularly disposed to each other with interior angles of 120° and exterior angles of 240° between successive flat sections, the concave inner surface of one of said construction elements forming three contiguous sides of a first regular hexagonal duct, the outer surface of one section of a second construction element forming a fourth side of the hexagonal duct adjacent to one of said three contiguous sides, the outer surface of one section of a third construction element forming a fifth side of the hexagonal duct adjacent to another of said three contiguous sides, the outer surface of one section of a fourth construction element forming a sixth side of the hexagonal duct extending between said fourth and fifth sides thereof, each of said second, third and fourth elements forming three sides of second, third and fourth hexagonal ducts adjacent to said first hexagonal duct, said second, third and fourth hexagonal ducts being completed by additional construction elements located as above described for said first hexagonal duct and means on each construction element at the back of each of said interior angles of said elements to engage one edge of an abutting construction element.

5. A structure as specified in claim 4 wherein said means comprises a channel formed on the convex surface of each construction element along the vertex of each 240° exterior angle, each said channel being adapted to receive an edge of one flat section of an adjoining construction element.

6. A duct construction element comprising an elongated one piece member having a central portion and two side portions, said member having a cross section which is one-half a regular hexagon, longitudinal edges of said portions remote from the vertices of said semihexagonal cross section constituting free edges of said one piece member, and located means mounted on the line of a plurality of corresponding vertices, said locating means having centerlines bisecting exterior angles of said semihexagonal cross section, said locating means being capable of slidably receiving one of the free edges of another identical construction element to locate adjacent elements with respect to each other.

7. A duct construction element as specified in claim 6 wherein said locating means comprise channel means extending along said line of vertices respectively.

8. A duct construction element as specified in claim 7 wherein said construction element is formed from sheet metal bent to form three contiguous sides of a hexagonal duct, and wherein each said channel means is formed by multiple folds of the sheet along the vertex of one of the two said exterior angles.

References Cited in the file of this patent

UNITED STATES PATENTS

| | | |
|---|---|---|
| 111,727 | Conley | Feb. 14, 1871 |
| 366,195 | Arnold et al. | July 12, 1887 |
| 564,994 | Hart | Aug. 4, 1896 |
| 939,039 | Lawrence | Nov. 2, 1909 |
| 1,708,994 | Wylie | Apr. 16, 1929 |
| 2,057,942 | Fay | Oct. 20, 1936 |
| 2,388,297 | Slaughter | Nov. 6, 1945 |
| 2,577,120 | Franz | Dec. 4, 1951 |
| 2,968,118 | Paulson | Jan. 17, 1961 |

FOREIGN PATENTS

| | | |
|---|---|---|
| 1,000,152 | France | Feb. 8, 1952 |
| 1,027,845 | France | Jan. 15, 1953 |